No. 828,298. PATENTED AUG. 14, 1906.
A. BECKER.
PLANING MACHINE.
APPLICATION FILED JAN. 2, 1906.

2 SHEETS—SHEET 1.

Witnesses
P. Haddan
S. Ford

Inventor
Adolf Becker
by R. Haddan
Attorney

No. 828,298. PATENTED AUG. 14, 1906.
A. BECKER.
PLANING MACHINE.
APPLICATION FILED JAN. 2, 1906.
2 SHEETS—SHEET 2.
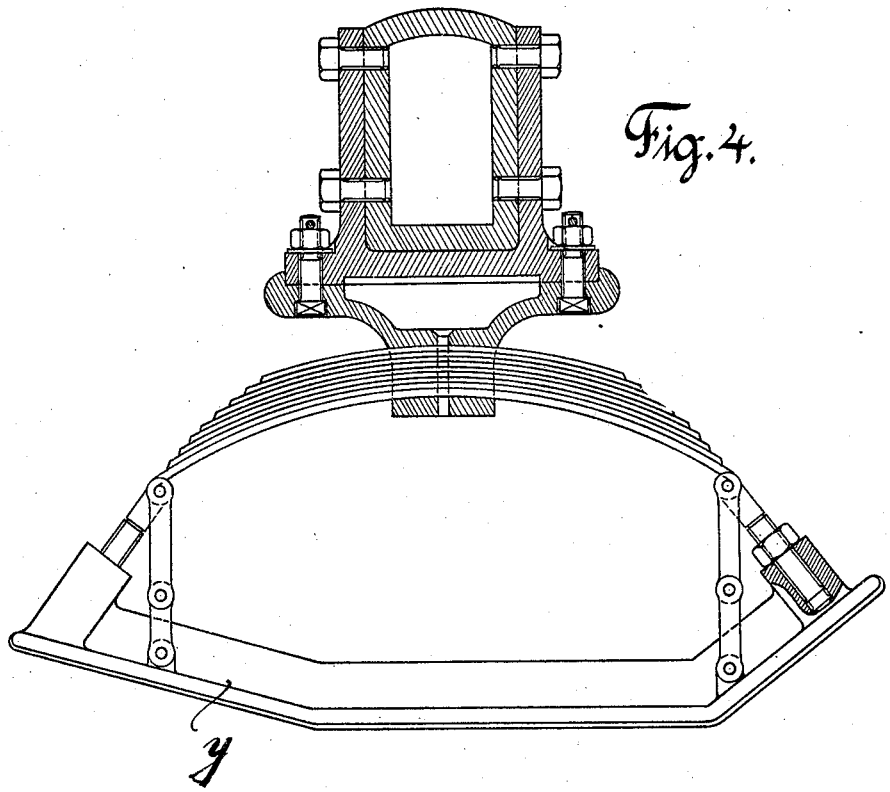
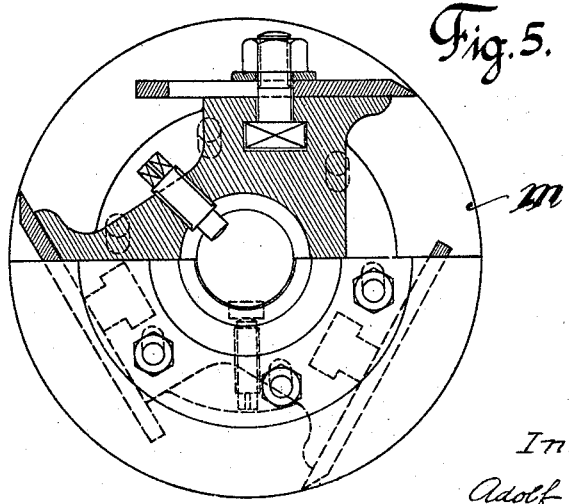
Witnesses.
P. Haddan
S. Ford
Inventor
Adolf Becker
By R. Haddan
Attorney

UNITED STATES PATENT OFFICE.

ADOLF BECKER, OF BERLIN, GERMANY.

PLANING-MACHINE.

No. 828,298. Specification of Letters Patent. Patented Aug. 14, 1906.

Application filed January 2, 1906. Serial No. 294,185.

*To all whom it may concern:*

Be it known that I, ADOLF BECKER, a subject of the King of Prussia, German Emperor, residing at 31 Kurfürstenstrasse, Berlin, Germany, have invented certain new and useful Improvements in Planing-Machines, of which the following is a specification.

This invention relates to a machine for planing railway-sleepers and the like. Since sleepers are not of uniform thickness when made, it is necessary to provide means for adjusting the sleeper with regard to the planing-tool.

According to the present invention this is effected by adjustably supporting the beds on which the sleepers are supported as they pass under the planes and providing a pair of rollers suspended above said beds in front of the plane-heads, these rollers normally lying at a distance from the beds when in their highest position corresponding to the thickness of the thinnest sleeper, so that all sleepers which are thicker than the latter abut against said rollers before reaching the planes and rotate the rollers. These rollers operate gear which displaces slides supporting the beds. This causes the latter to be lowered to an extent corresponding to the thickness of the respective sleeper—that is to say, until the sleeper in sinking ceases to touch the roller, so that the necessary adjustment of the space between the beds and the planes is effected.

The invention is illustrated in the annexed drawings, in which—

Figure 1:
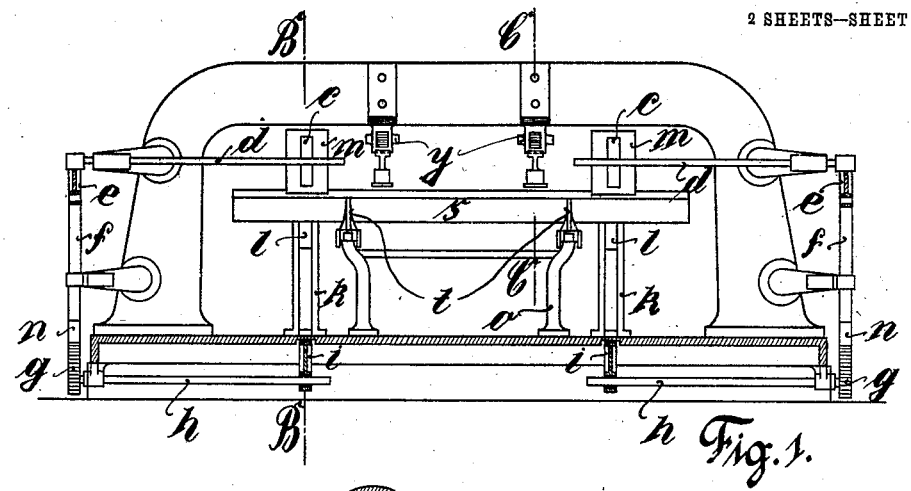
Figure 2:
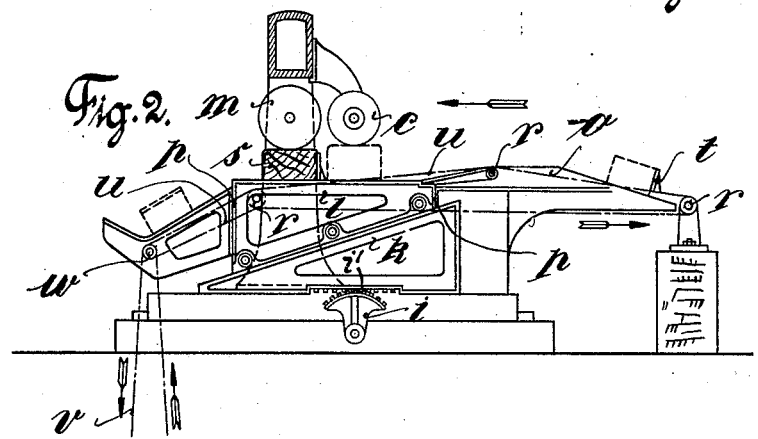
Figure 3:
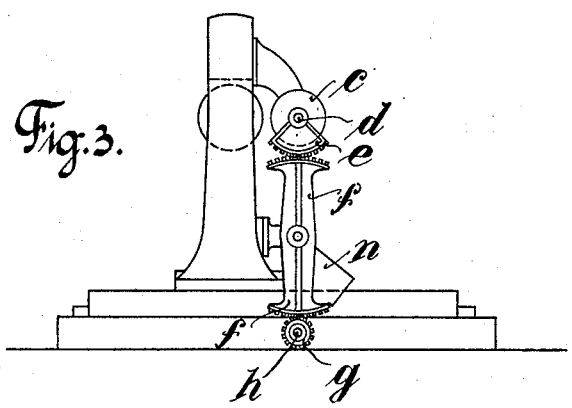

Figure 1 is a front view, Fig. 2, a section on the line B B of Fig. 1, and Fig. 3 a side view, of the improved machine. Figs. 4 and 5 are detail views on a larger scale.

The sleeper $s$ to be planed is moved along the bench $o$ toward the planes $m$, and (assuming it to be thicker than the minimum thickness) before reaching the planes it will abut against rollers $c$, mounted on shafts $d$, carrying at their outer ends toothed segments $e$. The latter mesh with double-rocking segments $f$, which mesh with toothed wheels $g$, mounted on the shafts $h$, carrying at their other ends segments $i$. The said toothed wheels $g$ and segments $i$ transmit the rotation of the rollers $c$ by means of racks $i'$ to horizontally-movable slides $k$, provided with inclined surfaces. The latter support the beds $l$, on which the sleeper slides. The shafts of rollers $c$ are sufficiently flexible to allow the sleeper to pass under the rollers, so that the passage of the sleeper revolves the rollers $c$ by frictional contact. The beds $l$, which are guided to move in a vertical direction, are by this means lowered until the upper face of the sleeper is just below the plane of the tangent at the lowest point of the rollers $c$, so that said sleeper ceases to contact with the roller, and thus ceases to revolve the latter as the sleeper moves onward under the planes $m$, as shown in Fig. 2. After the sleeper has passed under the planes and off the beds $l$ the latter, freed from the weight of the sleeper, rise to their highest position under action of weights $n$, connected with the segments $f$. Spring abutments $y$, Fig. 4, may be added to insure that the sleeper does not rise while on the beds $l$.

The sleepers are moved toward the rollers $c$ and planes $m$ by means of endless chains $u$ $t$, which travel over rollers $r$ and are driven by means of the shaft $w$ and transmission-gear $v$. The planes $m$ are shown in Fig. 5 as rotary cutters similar to milling cutters. Suitable mechanism (not shown) revolves them at a high rate of speed in the well-known manner.

What I claim as my invention, and desire to secure by Letters Patent of the United States, is—

1. In a planing-machine the combination with a plane and a bed for supporting the work, of a gaging-roller in front of the plane and means operated by said roller for adjusting said bed for the purpose set forth.

2. In a planing-machine the combination with a plane and a bed for supporting the work, of a gaging-roller in front of the plane, a slide supporting said bed and means operated by the gaging-roller for reciprocating said slide to lower and raise said bed for the purpose set forth.

3. In a planing-machine the combination with planes and beds for supporting the work, of gaging-rollers in front of the planes slides supporting said beds and means operated by the gaging-rollers for reciprocating said slides to lower and raise said beds for the purpose set forth.

4. In a planing-machine the combination with planes of vertically-movable beds having inclined lower surfaces and adapted to support the work, gaging-rollers mounted in front of the planes, reciprocatable slides having inclined upper surfaces coacting with the inclined surfaces of the beds, and shafts and segments operated by said gaging-rollers for reciprocating said slides to lower and raise the beds for the purpose set forth.

5. In a planing-machine the combination with a plane and bed for supporting the work, of a gaging-roller in front of the plane, means operated by said roller for adjusting said bed for the purpose set forth and means for feeding the work to said gaging-roller and plane.

6. In a planing-machine the combination with a plane and beds for supporting the work, of gaging-rollers in front of the planes, slides supporting said beds means operated by the gaging-rollers for reciprocating said slides to lower and raise said beds for the purpose set forth and means for feeding the work onto and from said beds.

7. In a planing-machine the combination with planes of vertically-movable beds having inclined lower surfaces and adapted to support the work, gaging-rollers mounted in front of the planes, reciprocatable slides having inclined upper surfaces coacting with the inclined surfaces of the beds, shafts and segments operated by said gaging-rollers for reciprocating said slides to lower and raise the beds for the purpose set forth and means for feeding the work onto and from said beds.

In witness whereof I have signed this specification in the presence of two witnesses.

ADOLF BECKER.

Witnesses:
HENRY HASPER,
WOLDEMAR HAUPT.